(12) United States Patent
Ramachandran et al.

(10) Patent No.: US 9,751,020 B2
(45) Date of Patent: *Sep. 5, 2017

(54) SYSTEM AND METHODS TO DISPLAY ICONS BASED ON MESSAGING ACTIVITY

(71) Applicant: Zynga Inc., San Francisco, CA (US)

(72) Inventors: Raja Ramachandran, Saratoga, CA (US); Ross W. Danielson, San Francisco, CA (US); Sachin B. Pansuria, Redwood City, CA (US); Dylan A. Tarre, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,166

(22) Filed: Jul. 19, 2016

(65) Prior Publication Data
US 2016/0346702 A1 Dec. 1, 2016

Related U.S. Application Data

(63) Continuation of application No. 13/948,774, filed on Jul. 23, 2013, now Pat. No. 9,421,453.

(Continued)

(51) Int. Cl.
*A63F 9/24* (2006.01)
*A63F 13/87* (2014.01)
(Continued)

(52) U.S. Cl.
CPC .............. *A63F 13/87* (2014.09); *A63F 13/20* (2014.09); *A63F 13/25* (2014.09); *A63F 13/32* (2014.09);
(Continued)

(58) Field of Classification Search
None
See application file for complete search history.

(56) References Cited

U.S. PATENT DOCUMENTS

| 2005/0209002 A1* | 9/2005 | Blythe ................... A63F 13/12 463/42 |
| 2007/0115991 A1 | 5/2007 | Ramani et al. |

(Continued)

OTHER PUBLICATIONS

"U.S. Appl. No. 13/948,774, Examiner Interview Summary mailed Apr. 22, 2016", 2 pgs.

(Continued)

*Primary Examiner* — Jason Yen
(74) *Attorney, Agent, or Firm* — Schwegman Lundberg & Woessner, P.A.

(57) ABSTRACT

A system, computer-readable storage medium storing at least one program, and a computer-implemented method to display icons based on messaging activity is provided. A request to access a game user interface of the first player is received from a client device of a first player, the game user interface being associated with a computer-implemented game. First player messaging activity information associated with messaging activity of the first player is accessed, the messaging activity of the first player including receipt of a message from one or more players associated with the computer-implemented game. A first manner of displaying one or more icons each identifying the one or more players is determined including determining the first manner based on the first player messaging information. Display data to display the one or more icons in the first manner within the game user interface is provided to the client device.

19 Claims, 12 Drawing Sheets

Related U.S. Application Data

(60) Provisional application No. 61/674,497, filed on Jul. 23, 2012, provisional application No. 61/674,500, filed on Jul. 23, 2013.

(51) Int. Cl.
 *A63F 13/32* (2014.01)
 *A63F 13/335* (2014.01)
 *A63F 13/25* (2014.01)
 *A63F 13/20* (2014.01)
 *A63F 13/79* (2014.01)

(52) U.S. Cl.
 CPC ............ *A63F 13/335* (2014.09); *A63F 13/79* (2014.09); *A63F 2300/308* (2013.01); *A63F 2300/556* (2013.01)

(56) References Cited

U.S. PATENT DOCUMENTS

| | | | |
|---|---|---|---|
| 2007/0218997 | A1 | 9/2007 | Cho |
| 2007/0265091 | A1* | 11/2007 | Aguilar, Jr. ............. G07F 17/32 463/42 |
| 2008/0276279 | A1* | 11/2008 | Gossweiler .......... H04N 21/235 725/46 |
| 2011/0197145 | A1* | 8/2011 | Huang ................ G06Q 10/107 715/752 |
| 2011/0275442 | A1* | 11/2011 | Hawkins, III .......... A63F 13/30 463/42 |
| 2011/0307807 | A1* | 12/2011 | Norby ................ G06Q 10/101 715/758 |
| 2012/0028718 | A1* | 2/2012 | Barclay ............... G07F 17/3218 463/42 |
| 2012/0122588 | A1* | 5/2012 | Berger .................... A63F 13/12 463/42 |
| 2012/0157212 | A1 | 6/2012 | Kane et al. |
| 2013/0054694 | A1* | 2/2013 | Maeng .................... H04L 67/24 709/204 |
| 2013/0268591 | A1* | 10/2013 | Chen ...................... G06Q 50/01 709/204 |
| 2014/0024450 | A1 | 1/2014 | Ramachandran et al. |

OTHER PUBLICATIONS

"U.S. Appl. No. 13/948,774, Final Office Action mailed Sep. 16, 2015", 14 pgs.

"U.S. Appl. No. 13/948,774, Non Final Office Action mailed Dec. 21, 2015", 11 pgs.

"U.S. Appl. No. 13/948,774, Notice of Allowance mailed Apr. 26, 2016", 19 pgs.

"U.S. Appl. No. 13/948,774, Pre-Interview First Office Action mailed May 4, 2015", 4 pgs.

"U.S. Appl. No. 13/948,774, Response filed Mar. 21, 2016 to Non Final Office Action mailed Dec. 21, 2015", 15 pgs.

"U.S. Appl. No. 19/948,774, Response filed Apr. 21, 2015 to Restriction Requirement mailed Jan. 23, 2015", 9 pgs.

"U.S. Appl. No. 13/948,774, Response filed Nov. 10, 2015 to Final Office Action mailed Sep. 16, 2015", 17 pgs.

"U.S. Appl. No. 13/948,774, Restriction Requirement mailed Jan. 23, 2015", 6 pgs.

* cited by examiner

SYSTEM AND METHODS TO DISPLAY ICONS BASED ON MESSAGING ACTIVITY

RELATED APPLICATIONS

This application is a continuation of U.S. patent application Ser. No. 13/948,774, filed on Jul. 23, 2013, which claims the priority benefit of U.S. Provisional Application No. 61/674,497, filed Jul. 23, 2012, which is incorporated herein by reference in its entirety and U.S. Provisional Application No. 61/674,500, filed Jul. 23, 2012, which is incorporated herein by reference in its entirety.

TECHNICAL FIELD

The present disclosure relates to games and applications in general and in particular to computer-implemented games.

BACKGROUND

Traditional online games are increasingly becoming more social. For example, some traditional online games may provide mechanisms where one player of a game can send messages to other players of the game. In some cases, such messaging may be part of a request feature that asks the other players to assist the one player in a game, such as providing game assets to accomplish or otherwise overcome in-game challenges. In other cases, such messaging may be part of a communication feature that facilitates communication between the players. Instant messages and messages exchanged through corresponding inboxes of the players are examples of communications. Typically, prior to sending a message to a player, the game system may present the sending player a user interface listing players capable of receiving the message. From the list, the sending player may then search and identify those players that are appropriate, often times manually filtering out players that should not receive the message.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
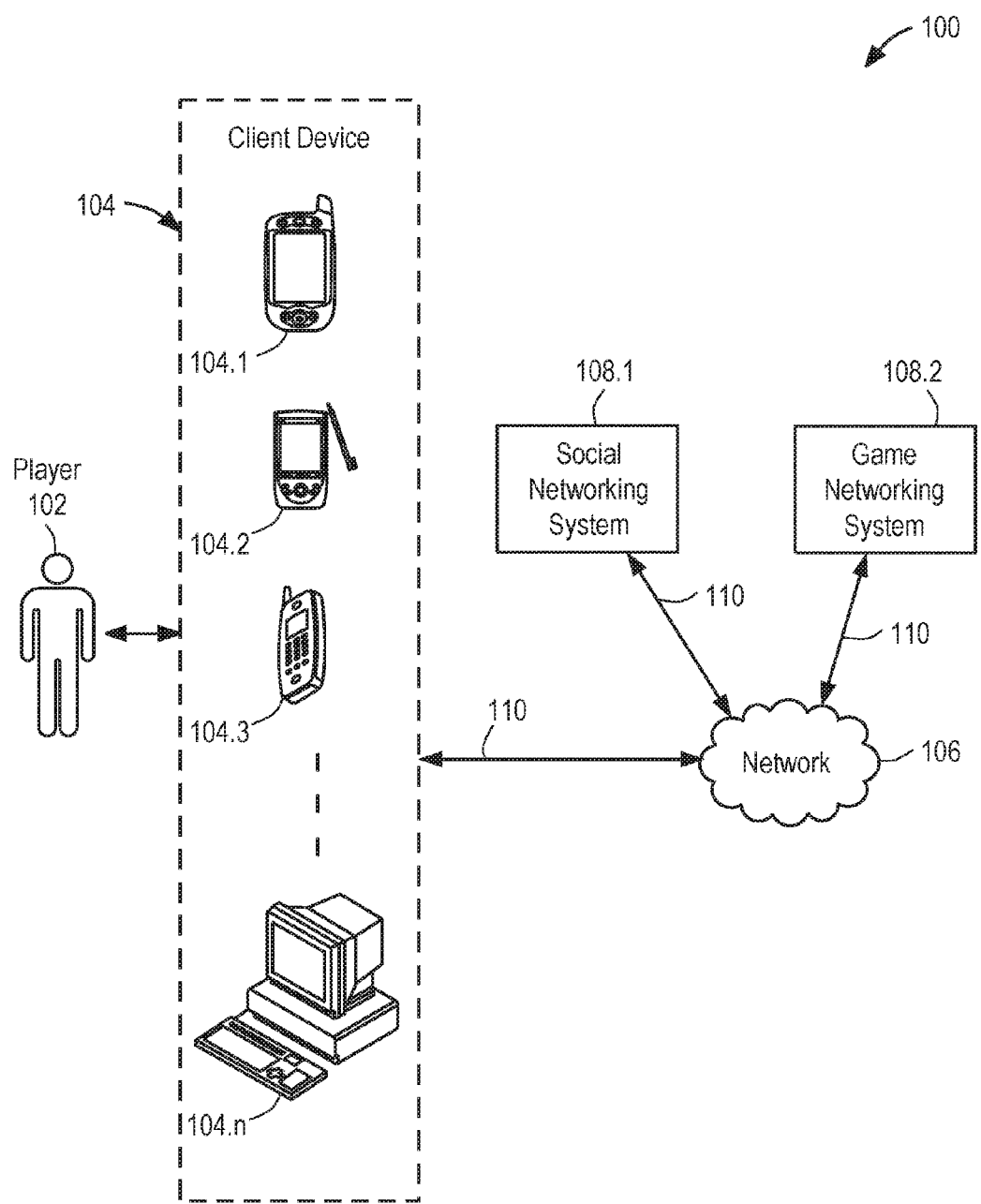
FIG. 1 is a schematic diagram showing an example of a system for implementing various example embodiments.

Players of one or more computer-implemented virtual games may be provided with a game user interface having one or more icons each identifying one or more players, where the one or more icons are displayed in a manner that is based on messaging activity. For example, a game user interface of a player may include a list of contacts or friends of the player with whom the player may communicate. The list of the player's friends may include icons or images identifying each friend, and the list may be automatically sorted based on the messaging activity of the player. A player's messaging activity may include any events, occurrences, or instances relating to the player's ability to communicate with other players (e.g., via instant messaging, email, video chat, etc. available through the game user interface).

The player may message other users associated with the game networking system, including other players within or outside of the player's social network, other players associated with the game networking system and a social networking system, other players associated with the game networking system but not associated with the social networking system, and the like.

In various embodiments, the player may use a communication user interface, included in the game user interface, to send messages to other users as part of the player's messaging activity. The list of player's friends may be included in the communication user interface. The player may select a friend from the list of friends and begin communicating with them. The player may also use the communication user interface to search for another player from the list of player's friends. In various embodiments, the list of player's friends is retrieved from the social networking system.

A game networking system associated with the game user interface may collect and generate information associated with a player's messaging activity. For example, the game networking system may collect and generate messaging activity information such as the identity of friends with whom the player last communicated, friends with whom the player is likely to chat, friends who are online, friends who are offline, all players who are online (whether or not the player is friends with the other player), the game levels or stages achieved by the player's friends, the identity of friends who are active in a game, the identity of friends that recently helped the player in a game, the average number of friends a player typically has, and the like. The generated message activity may be used to sort the player's list of friends.

In various embodiments, a game networking system associated with the game user interface may receive a request from the player to access the player's game user interface associated with a computer-implemented game. Upon receipt of the request, the game networking system may identify the player requesting access to the game user interface and may access any messaging activity information associated with the player. The message activity may be used to determine the manner of displaying a list of friends within the requested game user interface, and the game user interface may then be displayed to the player with the list of friends being displayed in the determined manner of display. For example, the list of friends may be displayed so that the most frequently contacted friends are displayed in the order of frequency. The player may begin playing the computer-implemented game associated with the game user interface and may communicate with other players using the communication user interface. If the player receives a message from a friend, the list of friends may be automatically adjusted to reflect this messaging activity accordingly. For example, the friend who sent the message to the player may move toward the top of the list of friends as a result of this messaging activity (e.g., the player has become more likely to chat with that friend, the friend has become the last person to communicate with the player, etc.).

In various embodiments, the communication user interface may provide the option to enable or disable communication with one or more friends. For example, as previously described, in some embodiments, the game user interface may be provided to the player via a social networking system. The player may be connected to friends or other players associated with the social networking system, the game networking system, or both. The player may have the option to disable communication with players who are associated with the game networking system but not associated with the social networking system.

Example System

FIG. 1 is a schematic diagram showing an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1.

The social networking system 108.1 may include a network-addressable computing system that can host one or more social graphs (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2.

Although FIG. 1 illustrates a particular example of the arrangement of the player 102, the client device 104, the social networking system 108.1, the game networking system 108.2, and the network 106, this disclosure contemplates that any suitable arrangement or configuration of the player 102, the client device 104, the social networking system 108.1, the game networking system 108.2, and the network 106 would likewise be applicable.

Figure 2:
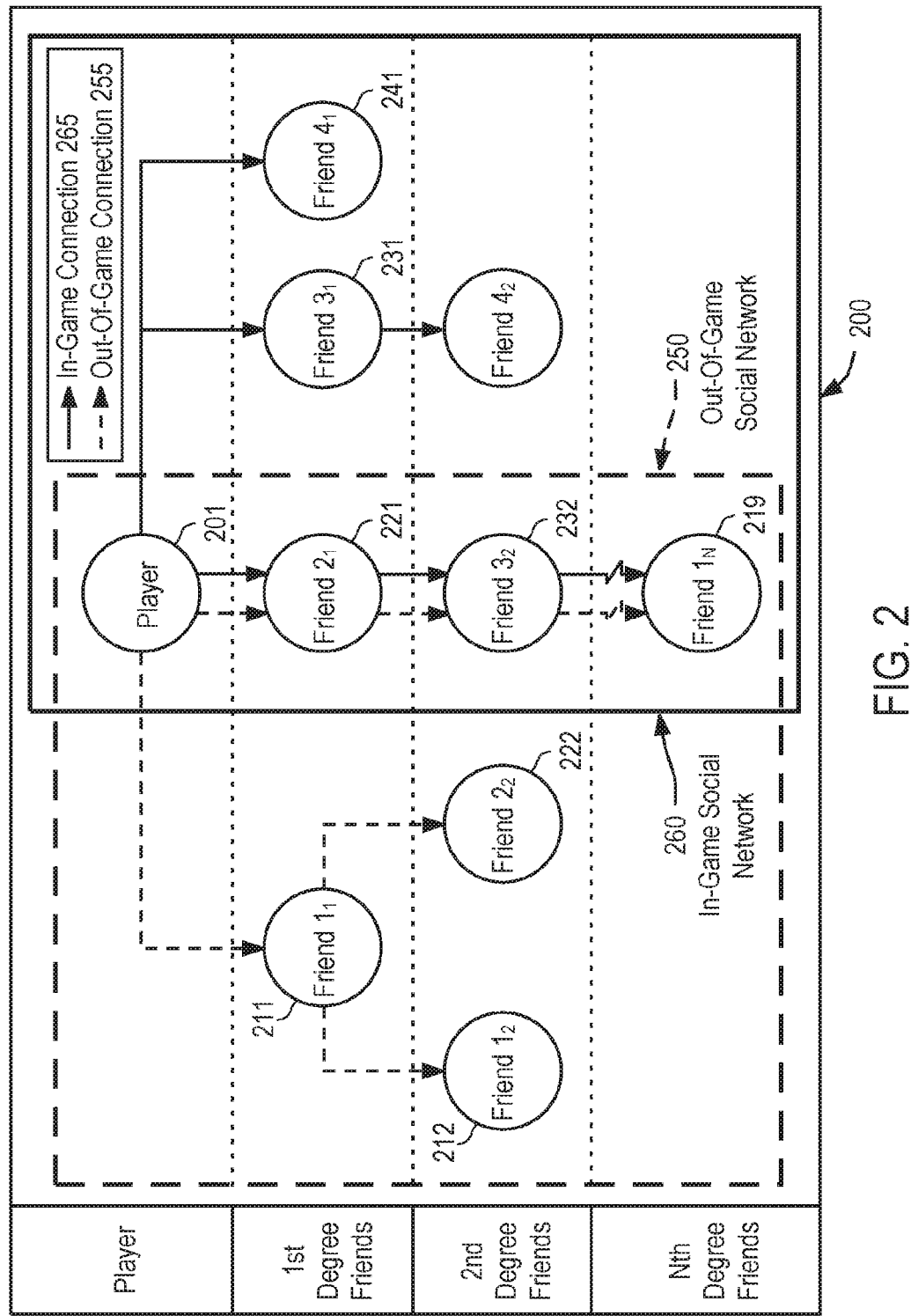
FIG. 2 is a schematic diagram showing an example of a social network within a social graph, according to an example embodiment.

FIG. 2 is a schematic diagram showing an example of a social network within a social graph 200, according to an example embodiment. The social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with one or more virtual games. In an example embodiment, each player may communicate with other players.

Communication User Interface Features

It is to be appreciated that a game user interface for a game may be presented to the player in a variety of manners. In some embodiments, a game user interface associated with one or more computer-implemented games may be provided to a player via a client device of the player. The game user interface may be associated with a player and may include a communication user interface. In various embodiments, the communication user interface may include icons identifying other players with whom the player associated with the game user interface may communicate. The other players may be within or outside of the player's social network, other players associated with the game networking system and a social networking system, other players associated with the game networking system but not associated with the social networking system, and the like. The icons identifying other players may be displayed to the player associated with the game user interface in a manner that is determined based on any data or information associated with the player's messaging activity. As previously described, messaging activity associated with the player may include any events, occurrences, or instances relating to the player's ability to communicate with other players (e.g., via instant messaging, email, video chat, etc. available through the game user interface). A game networking system associated with the game user interface may monitor messaging activity and collect and generate any information relating to the messaging activity of the player associated with the game user interface. For example, the game networking system may collect and generate messaging activity information such as the identity of friends with whom the player last communicated, friends with whom the player is likely to chat, friends who are online, friends who are offline, all players who are online (whether or not the player is friends with the other player), the game levels or stages achieved by the player's friends, the average number of friends a player typically has, and the like. The messaging activity information may be used to automatically arrange the icons identifying other players in any manner relating to the player's messaging activity.

Figure 3:
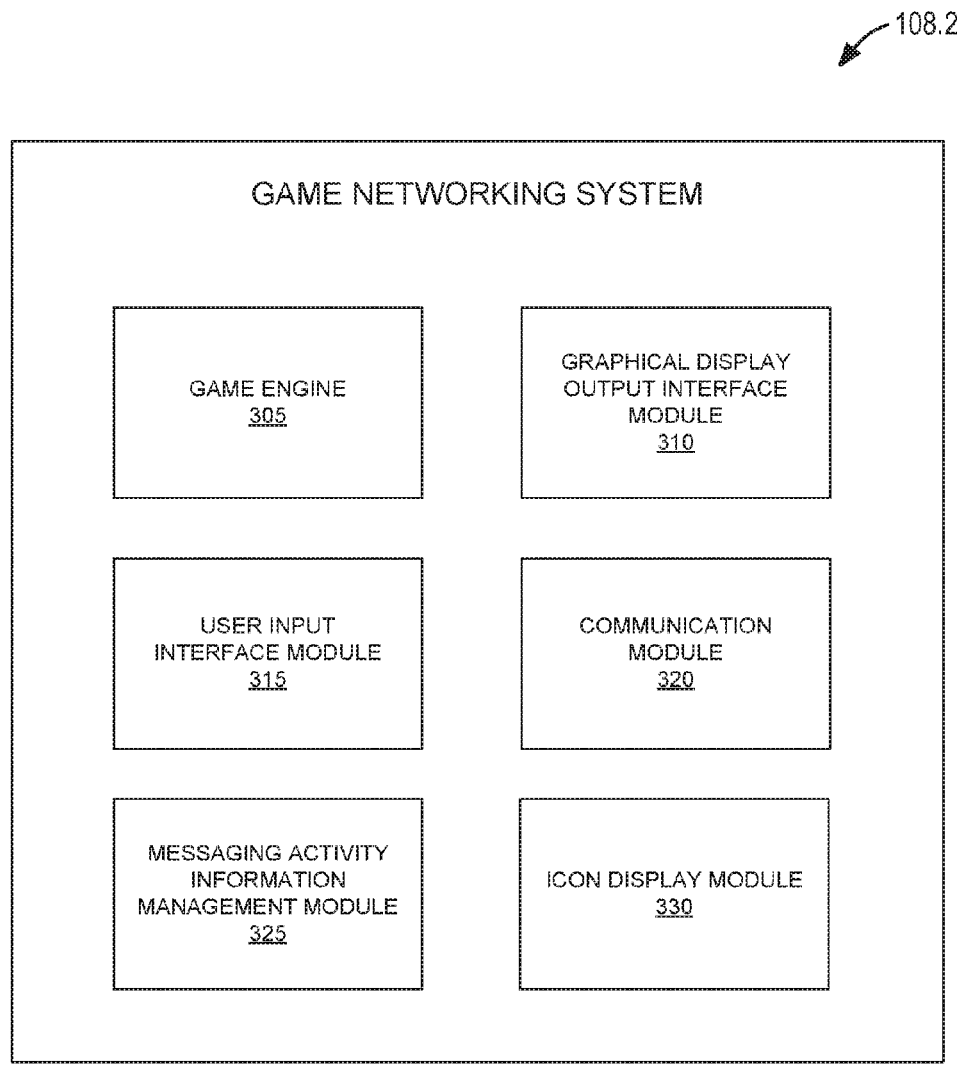
FIG. 3 is a block diagram showing example components of a game networking system, according to an example embodiment.

FIG. 3 is a block diagram showing example components of a game networking system 108.2, according to an example embodiment. Game networking system 108.2 may include a game engine 305, a graphical display output interface module 310, a user input interface module 315, a communication module 320, a messaging activity information management module 325, and an icon display module 330.

The game engine 305 may be a hardware-implemented module which may manage and control any aspects of a game based on rules of the game, including how a game is played, players' actions and responses to players' actions, and the like. The game engine 305 may be configured to generate a game instance of a game of a player and may determine the progression of a game based on user inputs and rules of the game.

The graphical display output interface module 310 may be a hardware-implemented module which may control information or data that is provided to client systems for display on a client device. For example, the graphical display output interface module 310 may be configured to provide display data associated with displaying a game instance of a game, displaying a game user interface associated with one or more games, displaying icons identifying one or more players, and the like.

The user input interface module 315 may be a hardware-implemented module which may receive user inputs for processing by the game engine 305 based on rules of the game. For example, the user input interface module 315 may receive user inputs indicating functions, such as a move made by a player, a request to send a message from one player to another player, and the like.

The communication module 320 may be a hardware-implemented module which may manage and control communication between players. For example, the communication module 320 may manage and control the communication user interface displayed within the game user interface, how players communicate with one another, the initiation, generation, and termination of a communication session between players, the history of messages between players, and the like. Further, the communication module 320 may be used to conduct messaging activities of the players. The players may use the communication user interface, managed by the communication module 320, to communicate with other players. For example, the player may select an icon associated with the player's friend from the communication user interface. In response the communication module 320 may present a chat user interface to the player. The player may use the chat interface to send messages to other players. In various embodiments, the communication user interface is presented to the user while the game is loading onto the client device from the game server. In other words, before the game is fully loaded onto the client device of the player, the player may communicate with other players via the communication user interface Furthermore, in addition to synchronous messaging, the communication module 320 may allow asynchronous messaging, including allowing a player to send a message to an offline friend who may receive the message via in the communication user interface when the friend comes back online, receive a message in the communication user interface that was sent while the player was offline, and the like. The communication user interface may allow a user to have multiple concurrent one-on-one or group chats with one or more friends. The communication user interface may also allow the player to access a history of messages in which the player was involved.

The messaging activity information management module 325 may be a hardware-implemented module which may collect, generate, and manage information associated with messaging activities of players. For example, the messaging activity information management module 325 may collect, generate, and manage information relating to any events, occurrences, or instances relating to the player's ability to communicate with other players. As stated previously, the generated messaging activity information may include the identity of friends with whom the player last communicated, friends with whom the player is likely to chat, friends who are online, friends who are offline, all players who are online (whether or not the player is friends with the other player), the game levels or stages achieved by the player's friends, the identity of friends who are active in a game, the identity of friends that recently helped the player in a game, the average number of friends a player typically has, and the like. In various embodiments, a friend with whom the player is likely to chat may be determined based whether the player has communicated with the friend at least a predetermined number of instances. When a player requests access to the player's game user interface, the messaging activity information management module 325 may access information associated with the player's messaging activity to determine the manner of displaying icons identifying the player's friends.

The icon display module 330 may be a hardware-implemented module which may determine the manner of displaying icons within a communication user interface of a player based on the messaging activity information. The icon display module 330 may use the messaging activity information accessed by the messaging activity information management module 325 to determine how icons identifying the player's friends may be displayed. For example, if the icons are to be displayed based on the friends with whom the player most last communicated, the icon display module 330 may use the messaging activity information to determine the friends with whom the player most recently communicated and determine the order in which icons associated with those friends should be displayed (e.g., with the most recently contacted friend being at the top of the list). As another example, the icon display module 330 may order the icons according to a number of game achievements completed by the player's friends, by recent game activity conducted by the player's friends and the like. In various embodiments, when a player is running a search for a friend, the icon display module 330 may place an icon identifying the friend being searched at the top of the list. The icon display module 330 may also prevent the icons that do no match the search criteria from being displayed. In various embodiments, the icons identifying the player's friends may also be presented in a different color based on the messaging activity information.

Figure 4:
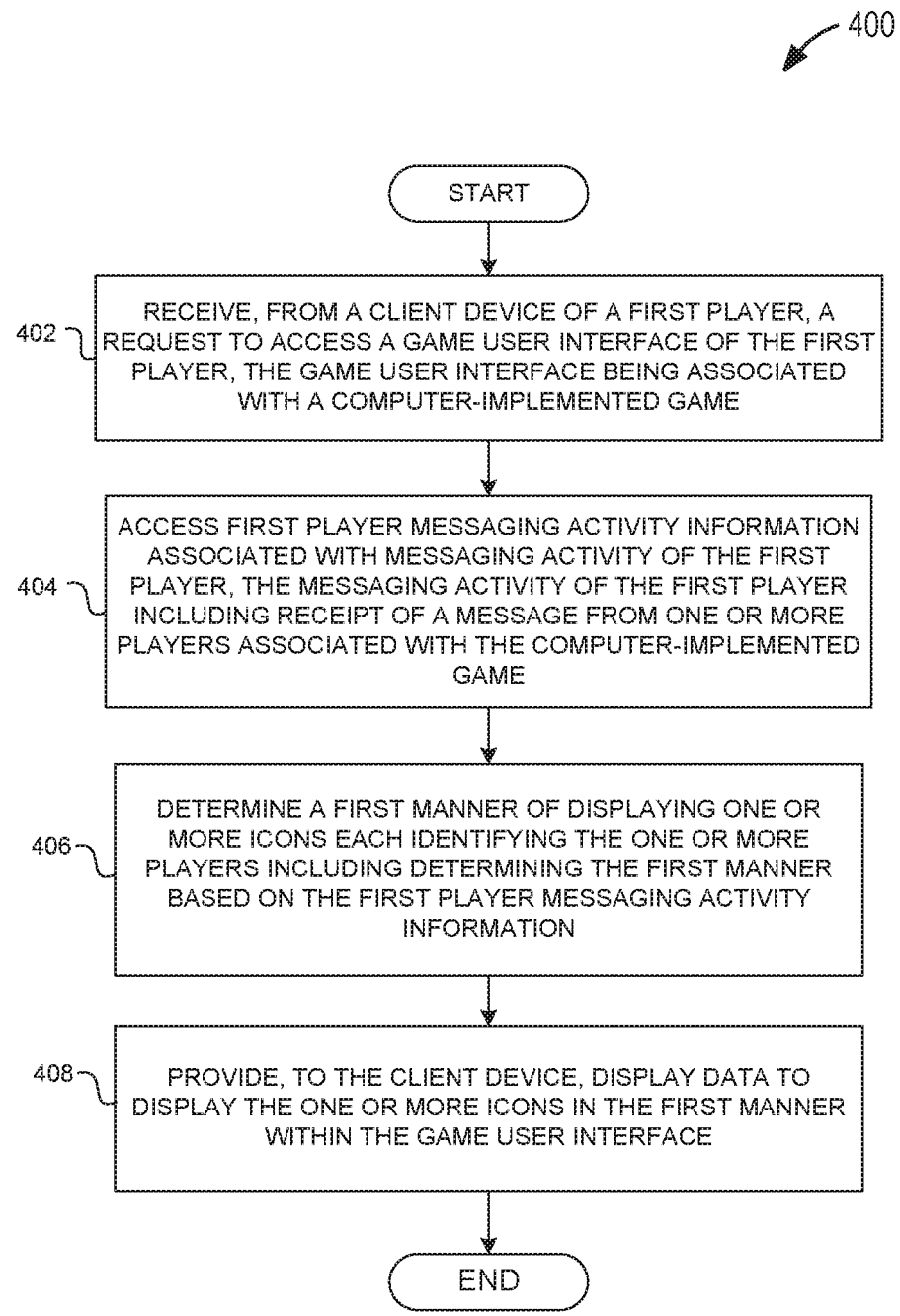
FIG. 4 is a flowchart showing an example method of displaying one or more icons each identifying one or more players based on messaging activity of a player, according to an example embodiment.

FIG. 4 is a flowchart showing an example method 400 of displaying one or more icons each identifying one or more players based on messaging activity of a player. The method may be performed using the game networking system 108.2 or the components thereof, as shown in FIG. 3.

In operation 402, the user input interface module 315 receives, from a client device of a first player, a request to access a game user interface of the first player, where the game user interface is associated with a computer-implemented game. In various embodiments, the game user interface includes a communication user interface that is controlled by the communication module 320.

In operation 404, the messaging activity information management module 325 accesses first player messaging activity information associated with messaging activity of the first player. As previously described, the messaging activity may include any activity relating to messaging functionality associated with the communication user interface included within the game user interface. For example, the messaging activity of the first player may include receipt of a message from one or more players associated with the computer-implemented game. In various embodiments, the messaging activity information management module 325 generates messaging activity information based on the messaging activity of the first player.

In operation 406, the icon display module 330 may determine a first manner of displaying one or more icons each identifying the one or more players. This may include determining the first manner based on the first player messaging activity information. For example, the icon display module 330 may order the icons so that the most frequently contacted friends are displayed. As another example, the icon display module 330 may order the icons according to number of game achievements, such as game levels or stages, completed by the friends.

In operation 408, the graphical display output interface module 310 may provide, to the client device, display data to display the one or more icons in the first manner within the game user interface. For example, the one or more icons identifying the one or more players may be displayed in order of when the first player previously communicated with each of the one or more players.

Figure 5:
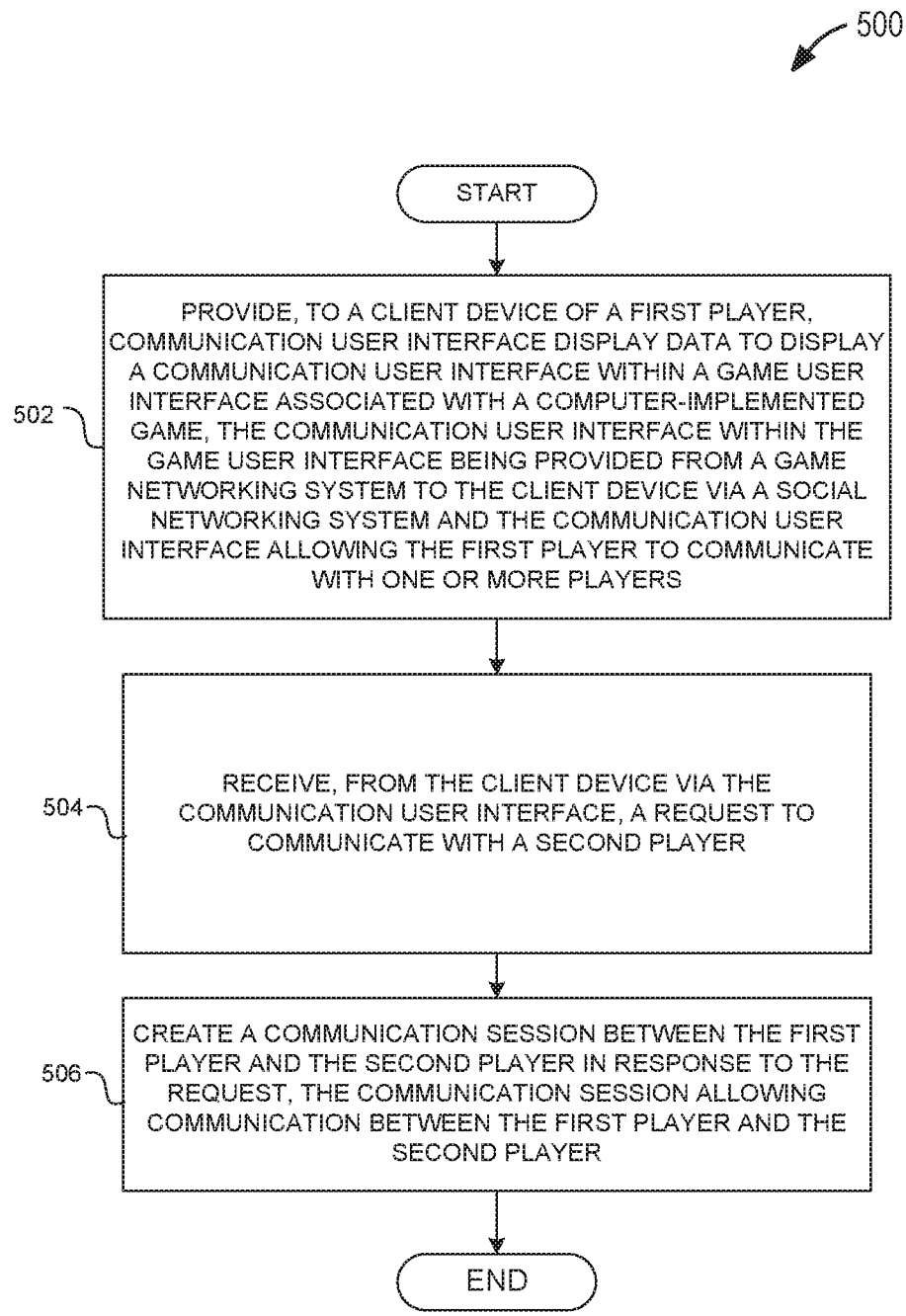
FIG. 5 is a flowchart showing an example method of establishing a communication session between players, according to an example embodiment.

FIG. 5 is a flowchart showing an example method 500 of establishing a communication session between players. The communication session established in the method 500 may be included in the messaging activity of the players and be collected by the messaging activity information management module 325. The method may be performed using the game networking system 108.2 or components thereof, as shown in FIG. 3.

In operation 502, the graphical display output interface module 310 may provide, to a client device of a first player, communication user interface display data to display a communication user interface within a game user interface associated with a computer implemented game. The communication users interface that is displayed within the game user interface may be provided from the game networking system 108.2 to the client device via a social networking system, such as the social networking system 108.1, as shown in FIG. 1. The communication user interface may allow the first player to communicate with one or more players as part of the player's messaging activity with the one or more players. As an example, the communication user interface may include icons associated with the first player's friends. The first player may select an icon from the communication user interface to request communication with a second player.

In operation 504, the user input interface module 315 may receive, from the client device via the communication user interface, a request to communicate with a second player. In various embodiments, the second player is associated with the game networking system without being associated with the social networking system. In various embodiments, the second player is associated with the game networking system and associated with the social networking system.

In operation 506, the communication module 320 may create a communication session between the first player and the second player in response to the request. The communication session may allow communication between the first player and the second player. In various embodiments, the communication session is conducted through a chat user interface. Messages between the two players may be displayed in the chat user interface. The messages sent between the two players may constitute messaging activity of the two players and therefore may be managed by the messaging activity information management module 325.

Figure 6:
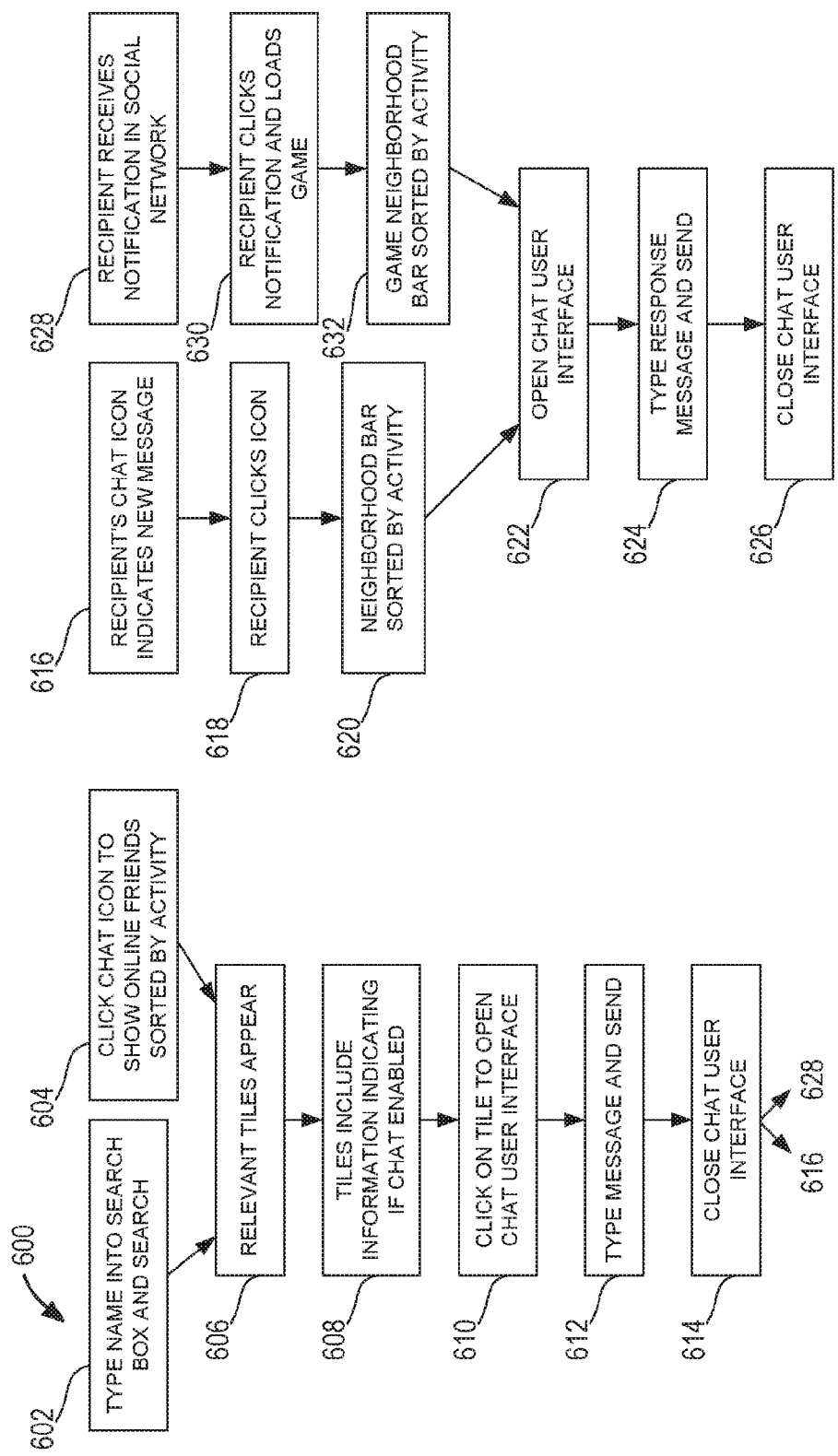
FIG. 6 is a flowchart showing an example method of initiating and maintaining a communication between players using a communication user interface, according to an example embodiment.

FIG. 6 is a flowchart showing an example method 600 of initiating and maintaining a communication between players using a communication user interface, according to an example embodiment. In operation 602, the communication may be initiated when a player types a name of another player into a search box and runs the search for the other player. For example, if the player wishes to initiate a communication with a friend, the player may enter the friend's name or username (or a portion thereof) into the search box and run a search for the friend. Alternatively, in operation 604, the communication may be initiated when a user clicks on a chat icon to display online friends. In some embodiments, the chat icon may display all of the player's friends, both online and offline. In some embodiments, the online friends may be sorted by the icon display module 330 based on the messaging activity information.

In operation 606, in response to either running a search for a particular friend or clicking the chat icon, the relevant friend icons (or neighbor tiles/cards) identifying the player's friends may be displayed to the player. The relevant friend icons may be determined by the icon display module 330 and displayed to the user using the graphical display output interface module 310.

In operation 608, the neighbor tiles may include a symbol for friends who have their chat functionalities enabled and who are available/online. In various embodiments, the neighbor tiles may also include a different symbol for friends who are offline.

In operation 610, the player may click on any portion of a neighbor tile to open chat user interface for communicating with the friend identified by the neighbor tile.

In operation 612, the player may use the chat user interface to type a message to the friend. The player may then either click on a send button or may press the enter key on the client device keyboard to send the message to the friend.

In operation 614, the player may close the chat user interface to make the chat user interface disappear in the game user interface by clicking on a close button on the chat user interface.

In one embodiment, if the friend is online when the message is sent, in operation 616, the friend's chat icon may change to signify that a new message has been received. In various embodiments, the icon may appear dotted to signify the new message.

In operation 618, the friend receiving the message may click on the chat icon button when the friend is notified. In response, the icon may no longer appear dotted after being clicked on.

In operation 620, the icon display module 330 may sort the icons identifying other players based on the messaging activity information with those players/neighbors who sent messages. For example, neighbors with whom the friend has had recent communication activity may have icons that are highlighted and positioned at the front of the list, such as the rightmost positions in the list.

In operation 622, when the friend clicks on a neighbor tile, the chat user interface may open and may contain the message sent from that neighbor to the friend. For example, the friend may open a chat user interface containing the message sent from the player to the friend in operation 612.

In operation 624, the friend may use the chat user interface to type a message and send a response to the neighbor by clicking send on the chat user interface or by pressing the enter key on the client device keyboard of the friend.

In operation 626, the friend may close the chat user interface in a similar manner to that in operation 614.

In a second alternative embodiment, in operation 628, the friend may receive a notification indicating the message sent in operation 612 in a user interface associated with a social networking system (e.g., FACEBOOK™) through which a game user interface may be provided.

In operation 630, the friend receiving the message sent in operation 612 may click on the notification to initiate a game user interface for a related computer-implemented game (e.g., ZYNGA™ FARMVILLE™). This may include loading and launching the game user interface for the related computer-implemented game.

In operation 632, once the computer-implemented game is loaded, the game user interface may load the communication user interface (e.g., a neighbor bar) displaying icons identifying the friend's neighbors. This may include loading and displaying icons for neighbors with messages before loading icons for other players without messages, as well as highlighting/indicating those icons for neighbors with messages in a differ manner than the icons that are loaded for the other players. As stated previously, the icons may be displayed in a manner determined by the icon display module 330. The friend may then use the communication user interface that has loaded to open a chat user interface (operation 622), type and send a message (operation 624), and close the chat user interface (operation 626). In various embodiments, before the computer-implemented game is fully loaded, the communication user interface may be presented to the player in the game user interface.

Figure 7:
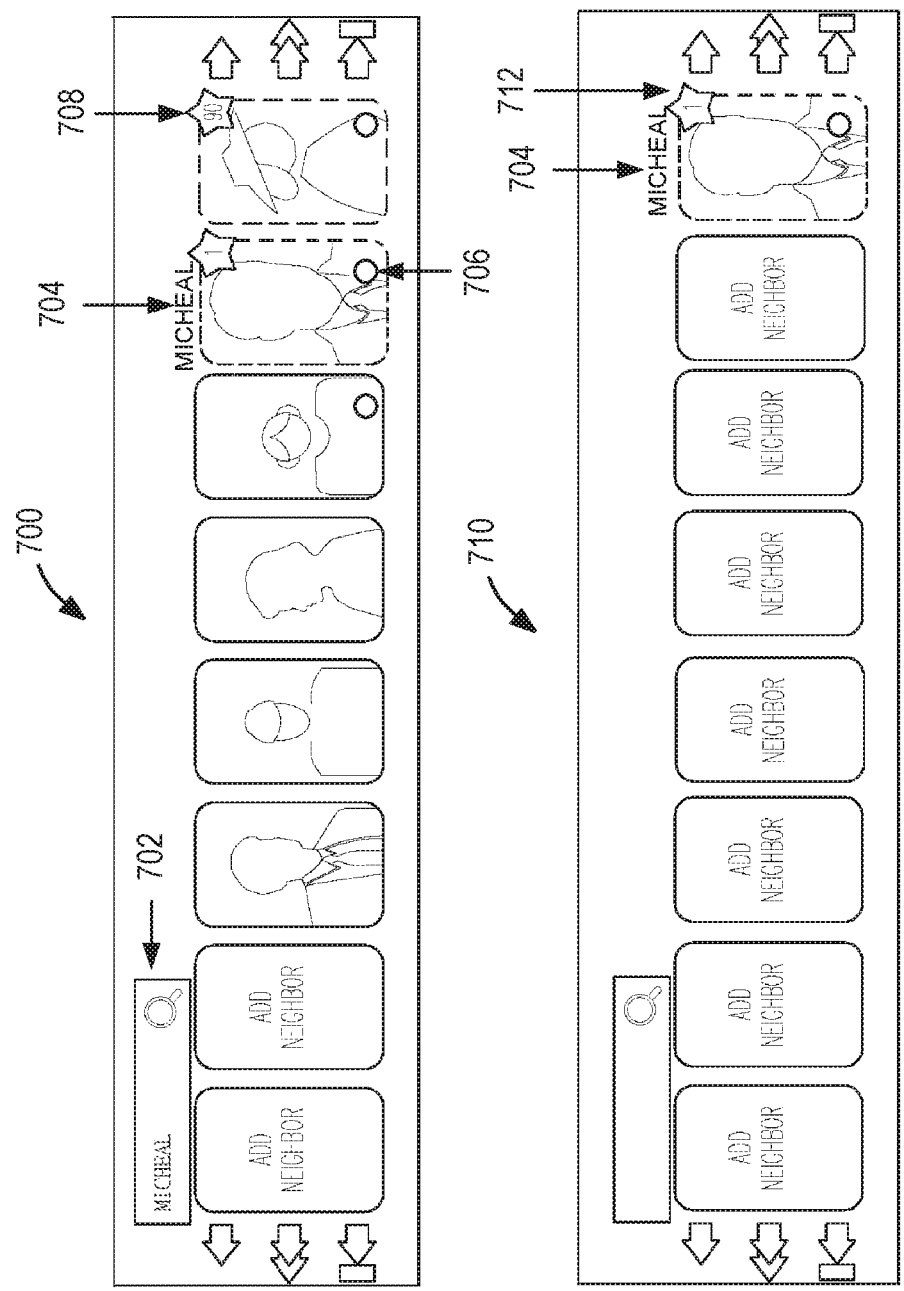
FIG. 7 is a user interface diagram showing example communication user interfaces being used in initiating a communication between players, according to an example embodiment.

FIG. 7 is a user interface diagram showing example communication user interfaces being used in initiating a communication between players, according to an example embodiment. In the first example communication user interface 700 of FIG. 7, upon loading the communication user interface (e.g., neighbor bar), the icons identifying the players in the communication user interface 700 may be pre-sorted into a mode based on users who are online and users who are not online. Users who are online may be indicated by a symbol, such as a circle 706. The online users may be grouped together and the users who are offline may be grouped together. In various embodiments, the icons in the communication user interface 700 are also pre-sorted based on a user's experience level, as indicated by the star displayed next to the icon. In the communication user interface 700, the icon with a "90" depicted in the star 708 may be placed prior to the icon with a "1" depicted in the star 712 because "90" may indicate more user experience/achievements than "1". In various embodiments, the icons may be highlighted to indicate that there is a message from the corresponding neighbor. For example, the border of icon 704 is shown to be dotted in order to indicate that there is a message from the neighbor of icon 704. The icon may continue to appear dotted until the player opens the message, such as by clicking on the icon.

In various embodiments, the communication user interface 700 includes a search bar 702 where the player is able to type in a name of a friend and run a search. FIG. 7 depicts "Micheal" being typed into the search bar 702 of the communication user interface 700. Alternatively, the player may provide any other identifying information in the search bar 702, such as an online alias, an identification number, an email address, and the like.

As shown in the second example communication user interface 710 of FIG. 7, the relevant neighbor may appear based on the search and the icons may be re-sorted. The icon 704 corresponding to the user named "Micheal" may be moved from its original position depicted in the communication user interface 700 to a new position in the communication user interface 710, the new position being the rightmost position of the communication user interface 710. In various embodiments, only the relevant neighbor may appear in the communication user interface 710 and the neighbors that do not match the search criteria are no longer displayed.

Figure 8:
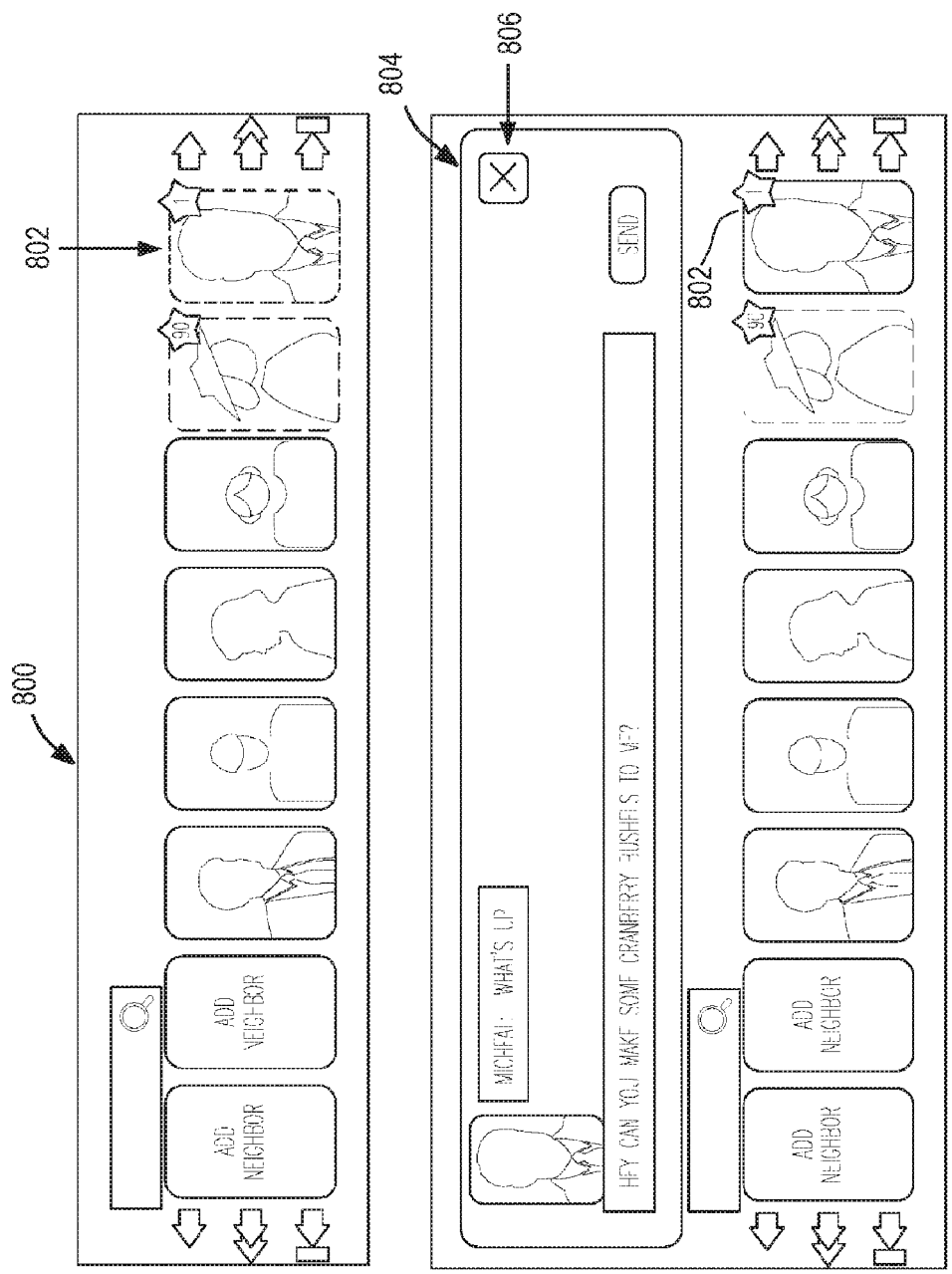
FIG. 8 is a user interface diagram depicting an example communication user interface and an example chat user interface being used to communicate between players, according to an example embodiment.

FIG. 8 is a user interface diagram depicting an example communication user interface 800 and an example chat user interface 804 being used to communicate between players, according to an example embodiment. In various embodiments, icon 802 is highlighted to indicate that there is a message from the neighbor identified by the icon 802. The chat user interface 804 may appear the clicking on icon 802 and opening the message. Once clicked, the icon 802 may no longer appear dotted because the message has been opened in the chat user interface 804. The chat user interface may be used to communicate with the neighbor corresponding to icon 802. The player may use the chat user interface to type and send a message. The player may also receive messages within the chat user interface 804. When communication with the neighbor is finished, the player may close the chat user interface by clicking on button 806.

Figure 9:
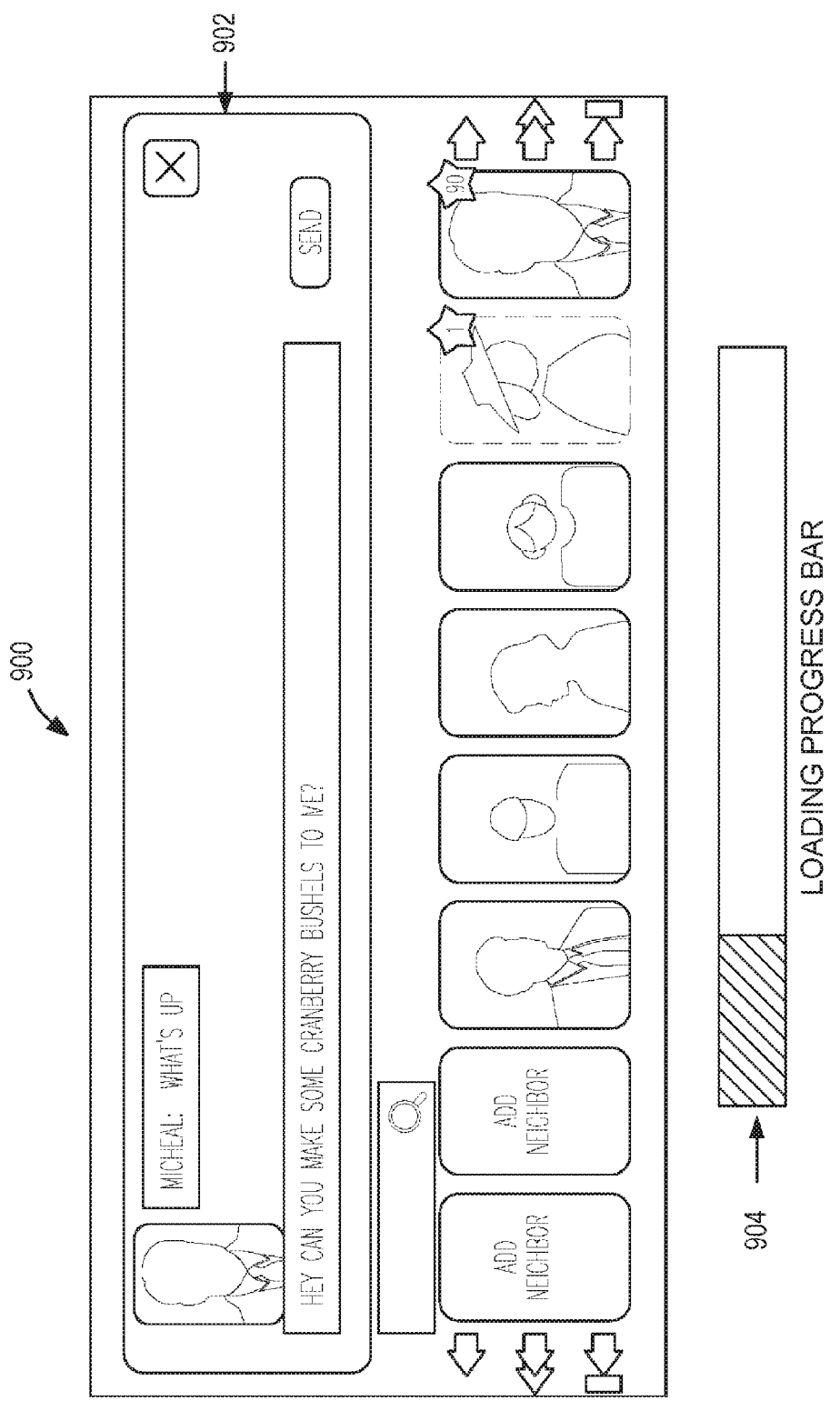
FIG. 9 is a diagram of an example user interface diagram depicting a communication between players while a computer-implemented game is loading, according to an example embodiment.

In various embodiments, a chat user interface may be displayed to the player while the game is loading. FIG. 9 is a diagram of an example user interface 900 depicting a communication between players while a computer-implemented game is loading, according to an example embodiment. When the player requests access to a game user interface associated with a computer-implemented game (e.g., ZYNGA™ FARMVILLE™), the game may initiate by loading and displaying the user interface 900 while loading. The loading bar 904 of the user interface 900 may display the progress of the loading of the game. The user interface 900 may also display the communication user interface with icons identifying one or more of the player's friends, as well as the chat user interface 902 for any messages that the player may have received while the player was away from the game. The player may use the chat user interface 902 to communicate with other players while the computer-implemented game is loading.

Figure 10:
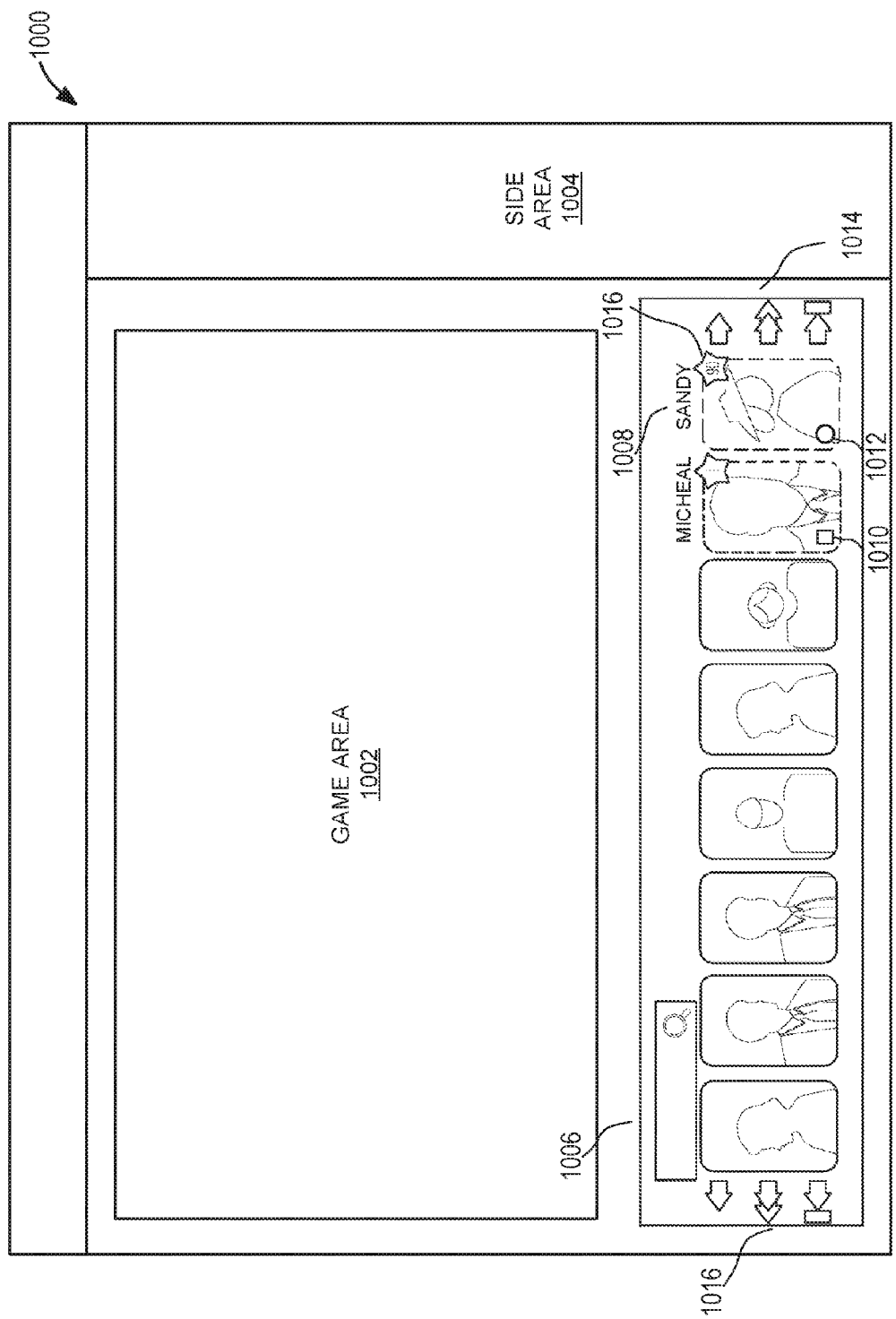
FIG. 10 is an interface diagram illustrating an example game user interface having icons displayed in a manner that is based on information associated with messaging activity, according to an example embodiment.

FIG. 10 is an interface diagram illustrating an example game user interface 1000 having icons displayed in a manner that is based on information associated with messaging activity, according to an example embodiment. The game user interface 1000 includes a game area 1002 in which a game may be played (e.g., a gameboard associated with a particular game), a side area 1004 in which any other game features may be displayed (e.g., a chat user interface, a feed displaying other players' activities, etc.), and a friend portion 1006 in which icons identifying friends or contacts of the player may be displayed. The player associated with the game user interface 1000 may be provided with the ability to move the friend portion 1006 to different positions within the game user interface 1000. Additionally, the player may be able to scroll through the icons identifying friends using the arrows 1014.

Additionally, the icons identifying friends may be arranged within the friend portion 1006 in any manner that is based on information associated with messaging activity. For example, if the icons are displayed in a manner that is based on previously contacted players, the icon 1008 identifying Sandy may be displayed first or in the right-most position within the friend portion 1006 if Sandy was the most recently contacted friend, and the icon identifying Micheal may be displayed next if Micheal was the second most recently contacted friend, and so on. If Micheal later communicates with the player, the icons may be automatically rearranged so that the icon identifying Micheal is displayed at the right-most position and the icon associated with Sandy is displayed next to the icon associated with Micheal. Additionally, if the player is contacted by another friend whose icon is not currently being displayed within the friend portion 1006, the icon identifying that friend may automatically be displayed in the left-most position within the friend portion 1006.

Each icon identifying a player may include an offline indicator 1010 indicating that the player is currently offline and an online indicator 1012 indicating that the player is currently online. Additionally, the icons may be highlighted to indicate the player has a message waiting from the friend identified by the icon. As depicted in FIG. 10, the highlighted icons appear dotted around the border of the icon.

In various embodiments, the icons may be displayed in a manner that is based on game levels achieved by one or more players. The icons may also include a game level notification 1016 indicating game levels, stages, or the like that have been achieved by each friend identified by the icons.

In the example of FIG. 10, the icons within the friend portion 1006 are displayed in a manner that is based on messaging activity information that includes the levels achieved by each of the player's friends. For example, the icon 1008 identifying the player's friend Sandy indicates that Sandy has reached level 90, while the icon identifying the player's friend Michael indicates that Michael has reached level 1. Because Michael has only reached level 1, the icon identifying Michael is displayed to the left of Sandy within the friend portion 1006, while the icon identifying Sandy is displayed at the right-most position within the friend portion 1006.

Storing Game-Related Data

A database may store any data relating to game play within a game networking system 108.2. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment.

Example Game Systems, Social Networks, and Social Graphs

In a multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, the game networking system 108.2, or the communication system 108.3). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in a multiplayer game.

In some embodiments, the social graph is managed by the game networking system 108.2, which is managed by the game operator. In other embodiments, the social graph is part of a social networking system 108.1 managed by a third party (e.g., Facebook, Friendster, Myspace, Yahoo). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within a multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network is formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 11:
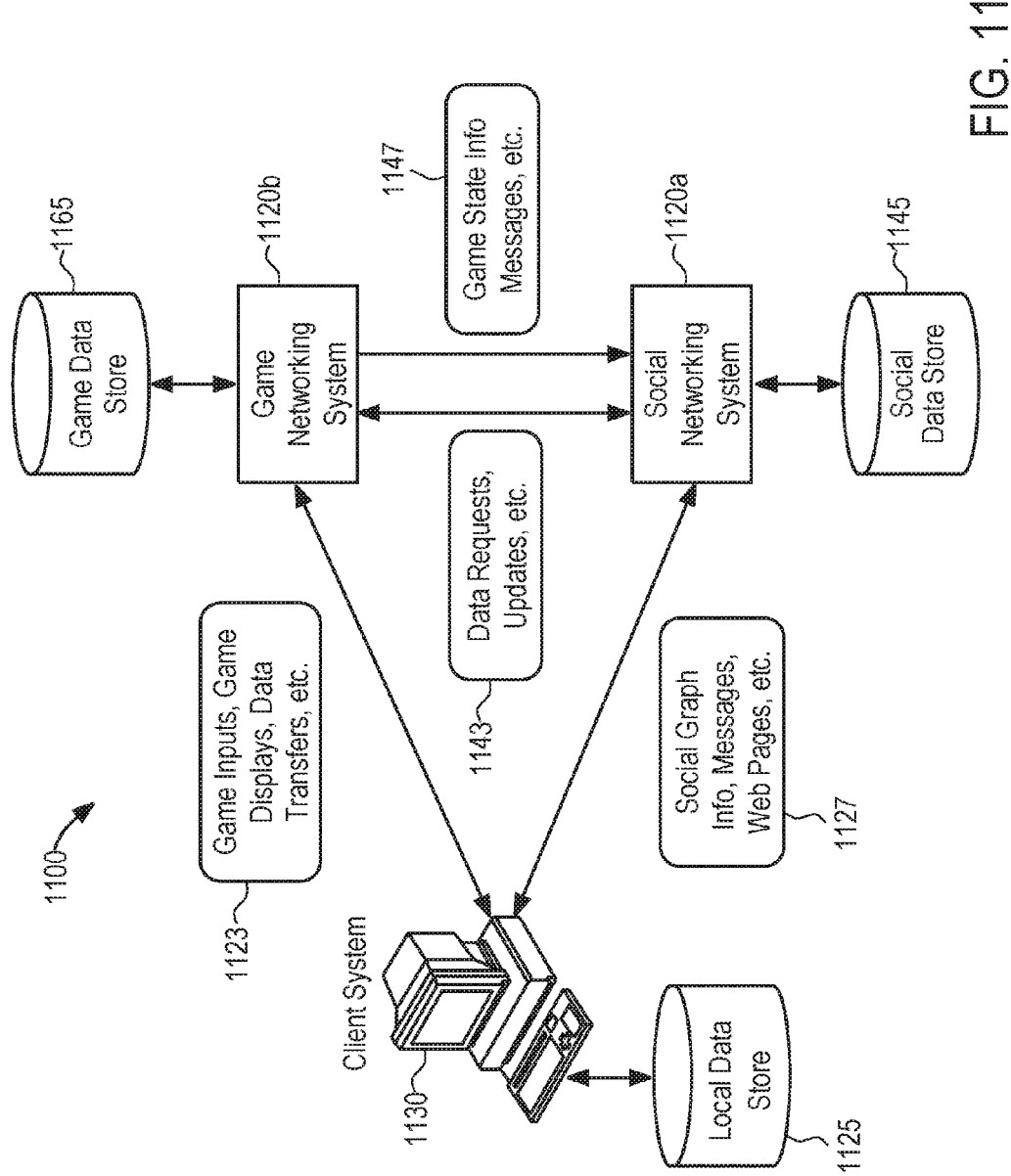
FIG. 11 is a diagrammatic representation of an example data flow between example components of an example system of FIG. 1, according to an example embodiment.

FIG. 11 is a diagrammatic representation of an example data flow between example components of an example system 1100. One or more of the components of the example system 1100 may correspond to one or more of the components of the example system 100. In some embodiments, system 1100 includes a client system 1130, a social networking system 1120a, and a game networking system 1120b. The components of system 1100 can be connected to each other in any suitable configuration, using any suitable type of connection. The components may be connected directly or over any suitable network. The client system 1130, the social networking system 1120a, and the game networking system 1120b may have one or more corresponding data stores such as the local data store 1125, the social data store 1145, and the game data store 1165, respectively.

The client system 1130 may receive and transmit data 1123 to and from the game networking system 1120b. This data can include, for example, a web page, a message, a game input, a game display, a HTTP packet, a data request, transaction information, and other suitable data. At some other time, or at the same time, the game networking system 1120b may communicate data 1143, 1147 (e.g., game state information, game system account information, page info, messages, data requests, updates, etc.) with other networking systems, such as the social networking system 1120a (e.g., FACEBOOK, MYSPACE, etc.). The client system 1130 can also receive and transmit data 1127 to and from the social networking system 1120a. This data can include, for example, web pages, messages, social graph information, social network displays, HTTP packets, data requests, transaction information, updates, and other suitable data.

Communication between the client system 1130, the social networking system 1120a, and the game networking system 1120b can occur over any appropriate electronic communication medium or network using any suitable communications protocols. For example, the client system 1130, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 1120b, the BLOB containing the game state for the instance corresponding to the player may be transmitted to the client system 1130 for use by a client-side executed object to process. In some embodiments, the client-side executable is a FLASH™-based game, which can de-serialize the game state data in the BLOB. As a player plays the game, the game logic implemented at the client system 1130 maintains and modifies the various game state parameters locally. The client-side game logic may also batch game events, such as mouse clicks, and transmit these events to the game networking system 1120b. Game networking system 1120b may itself operate by retrieving a copy of the BLOB from a database or an intermediate memory cache (memcache) layer. The game networking system 1120b can also de-serialize the BLOB to resolve the game state parameters and execute its own game logic based on the events in the batch file of events transmitted by the client to synchronize the game state on the server side. The game networking system 1120b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 1130. For example, a client application downloaded to the client system 1130 may operate to serve a set of web pages to a player. As another example, a virtual game may be an animated or rendered game executable as a stand-alone application or within the context of a webpage or other structured document. In some embodiments, the virtual game is implemented using ADOBE™ FLASH™-based technologies. As an example, a game may be fully or partially implemented as a SWF object that is embedded in a web page and executable by a FLASH™ media player plug-in. In some embodiments, one or more described web pages is associated with or accessed by the social networking system 1120a. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 1130, either caused by an action of a game player or by the game logic itself, the client system 1130 may need to inform the game networking system 1120b of the update. For example, if the game is a farming game with a harvest mechanic (such as ZYNGA™ FARMVILLE™), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as any one of an ADOBE™ FLASH™ object, MICROSOFT™ SILVERLIGHT™ object, HTML 5 object, and the like. FLASH™ may manipulate vector and raster graphics, and supports bidirectional streaming of audio and video. "FLASH™" may mean the authoring environment, the player, or the application files. In some embodiments, the client system 1130 may include a FLASH™ client. The FLASH™ client may be configured to receive and run FLASH™ application or game object code from any suitable networking system (such as, for example, the social networking system 1120a or the game networking system 1120b). In some embodiments, the FLASH™ client is run in a browser client executed on the client system 1130. A player can interact with FLASH™ objects using the client system 1130 and the FLASH™ client. The FLASH™ objects can represent a variety of in-game objects. Thus, the player may perform various in-game actions on various in-game objects by making various changes and updates to the associated FLASH™ objects.

In some embodiments, in-game actions are initiated by clicking or similarly interacting with a FLASH™ object that represents a particular in-game object. For example, a player can interact with a FLASH™ object to use, move, rotate, delete, attack, shoot, or harvest an in-game object. This disclosure contemplates performing any suitable in-game action by interacting with any suitable FLASH™ object. In some embodiments, when the player makes a change to a FLASH™ object representing an in-game object, the client-executed game logic may update one or more game state parameters associated with the in-game object. To ensure synchronization between the FLASH™ object shown to the player at the client system 1130, the FLASH™ client may send the events that caused the game state changes to the in-game object to the game networking system 1120*b*. However, to expedite the processing and hence the speed of the overall gaming experience, the FLASH™ client may collect a batch of some number of events or updates into a batch file. The number of events or updates may be determined by the FLASH™ client dynamically or determined by the game networking system 1120*b* based on server loads or other factors. For example, client system 1130 may send a batch file to the game networking system 1120*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the game play of a player or in response to the game engine (e.g., based on the game logic). In some embodiments, an application data update occurs when the value of a specific application datum is changed.

In some embodiments, when a player plays a virtual game on the client system 1130, the game networking system 1120*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 1120*b* may retrieve the corresponding BLOB from the database to determine the most-recent values of the game-related data. In some embodiments, while a player is playing the virtual game, the game networking system 1120*b* also loads the corresponding BLOB into a memory cache so that the game system may have faster access to the BLOB and the game-related data contained therein.

Figure 12:
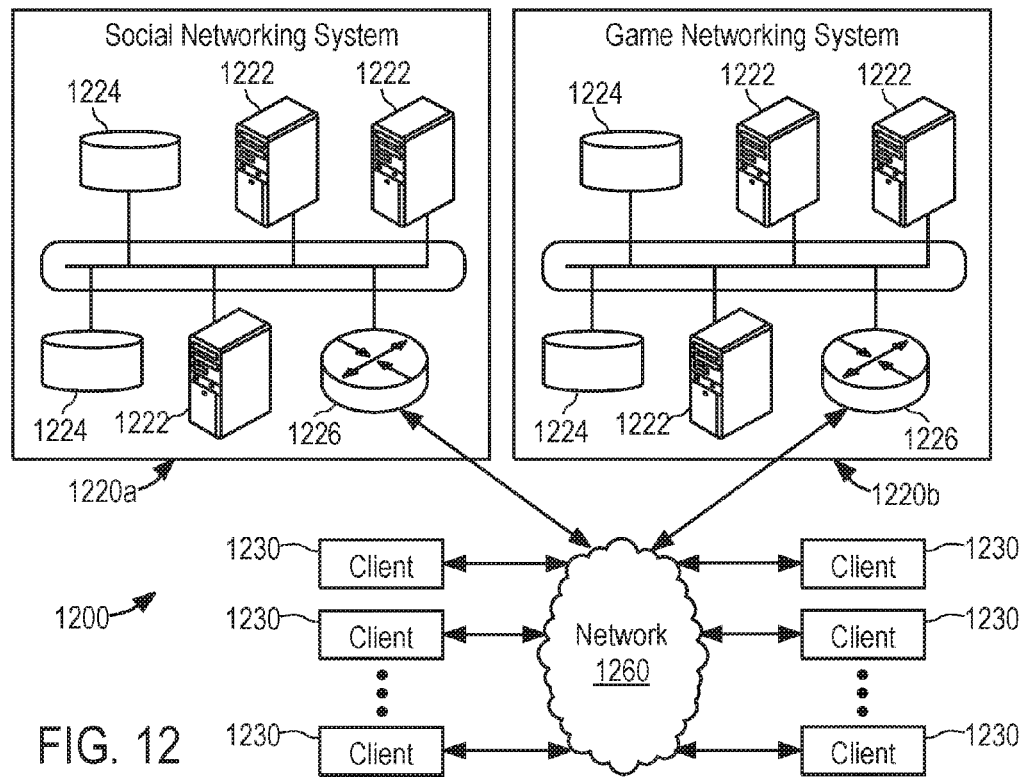
FIG. 12 is a schematic diagram showing an example network environment, in which various example embodiments may operate, according to an example embodiment.

Various embodiments may operate in a wide area network environment, such as the Internet, including multiple network addressable systems. FIG. 12 is a schematic diagram showing an example network environment 1200, in which various example embodiments may operate. Network cloud 1260 generally represents one or more interconnected networks, over which the systems and hosts described herein can communicate. Network cloud 1260 may include packet-based wide area networks (such as the Internet), private networks, wireless networks, satellite networks, cellular networks, paging networks, and the like. As FIG. 12 illustrates, various embodiments may operate in a network environment 1200 comprising one or more networking systems, such as a social networking system 1220*a*, a game networking system 1220*b*, and one or more client systems 1230. The components of the social networking system 1220*a* and the game networking system 1220*b* operate analogously; as such, hereinafter they may be referred to simply as the networking system 1220. The client systems 1230 are operably connected to the network environment 1200 via a network service provider, a wireless carrier, or any other suitable means.

The networking system 1220 is a network addressable system that, in various example embodiments, comprises one or more physical servers 1222 and data stores 1224. The one or more physical servers 1222 are operably connected to computer network cloud 1260 via, by way of example, a set of routers and/or networking switches 1226. In an example embodiment, the functionality hosted by the one or more physical servers 1222 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), FLASH™, ActionScript, and the like.

The physical servers 1222 may host functionality directed to the operations of the networking system 1220. Hereinafter servers 1222 may be referred to as server 1222, although the server 1222 may include numerous servers hosting, for example, the networking system 1220, as well as other content distribution servers, data stores, and databases. Data store 1224 may store content and data relating to, and enabling, operation of, the networking system 1220 as digital data objects. A data object, in some embodiments, is an item of digital information typically stored or embodied in a data file, database, or record. Content objects may take many forms, including: text (e.g., ASCII, SGML, HTML), images (e.g., JPEG, TIF and GIF), graphics (vector-based or bitmap), audio, video (e.g., MPEG), or other multimedia, and combinations thereof. Content object data may also include executable code objects (e.g., games executable within a browser window or frame), podcasts, and the like.

Logically, data store 1224 corresponds to one or more of a variety of separate and integrated databases, such as relational databases and object-oriented databases, that maintain information as an integrated collection of logically related records or files stored on one or more physical systems. Structurally, data store 1224 may generally include one or more of a large class of data storage and management systems. In some embodiments, data store 1224 may be implemented by any suitable physical system(s) including components, such as one or more database servers, mass storage media, media library systems, storage area networks, data storage clouds, and the like. In one example embodiment, data store 1224 includes one or more servers, databases (e.g., MySQL), and/or data warehouses. Data store 1224 may include data associated with different networking system 1220 users and/or client systems 1230.

The client system 1230 is generally a computer or computing device including functionality for communicating (e.g., remotely) over a computer network. The client system 1230 may be a desktop computer, laptop computer, personal digital assistant (PDA), in- or out-of-car navigation system, smart phone or other cellular or mobile phone, or mobile gaming device, among other suitable computing devices. Client system 1230 may execute one or more client applications, such as a Web browser.

When a user at a client system 1230 desires to view a particular webpage (hereinafter also referred to as target structured document) hosted by the networking system 1220, the user's web browser, or other document rendering engine or suitable client application, formulates and transmits a request to the networking system 1220. The request generally includes a URL or other document identifier as well as metadata or other information. By way of example, the request may include information identifying the user, a timestamp identifying when the request was transmitted, and/or location information identifying a geographic location of the user's client system 1230 or a logical network location of the user's client system 1230.

Although the example network environment 1200 described above and illustrated in FIG. 12 is described with respect to the social networking system 1220a and the game networking system 1220b, this disclosure encompasses any suitable network environment using any suitable systems. For example, a network environment may include online media systems, online reviewing systems, online search engines, online advertising systems, or any combination of two or more such systems.

Figure 13:
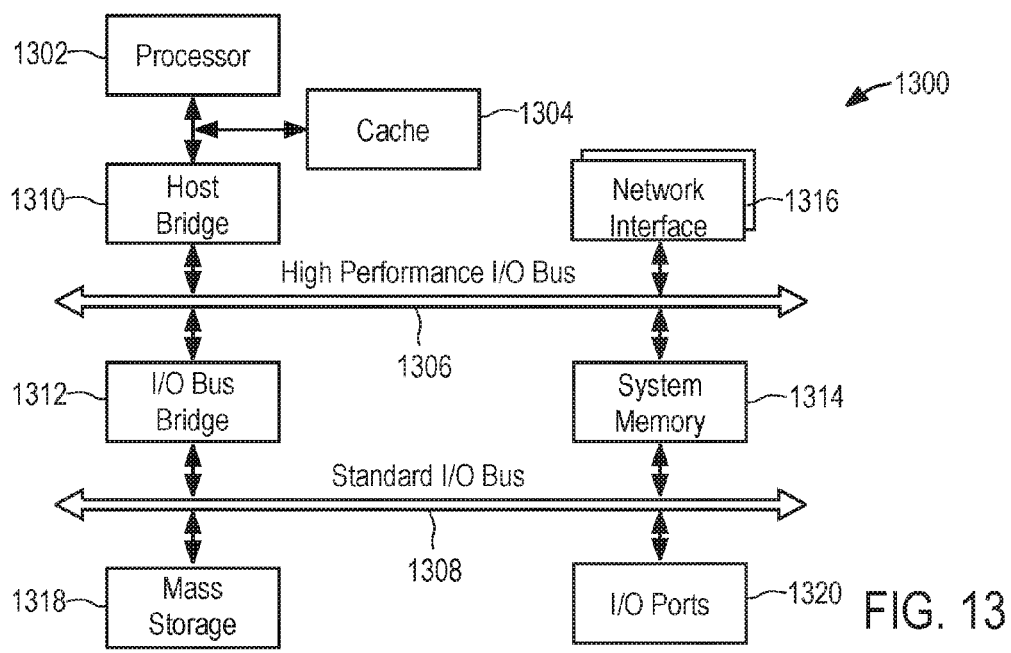
FIG. 13 is a block diagram illustrating an example computing system architecture, which may be used to implement one or more of the methodologies described herein, according to an example embodiment.

FIG. 13 is a block diagram illustrating an example computing system architecture, which may be used to implement a server 1222 or a client system 1230. In one embodiment, the hardware system 1300 comprises a processor 1302, a cache memory 1304, and one or more executable modules and drivers, stored on a tangible computer-readable storage medium, directed to the functions described herein. Additionally, the hardware system 1300 may include a high performance input/output (I/O) bus 1306 and a standard I/O bus 1308. A host bridge 1310 may couple the processor 1302 to the high performance I/O bus 1306, whereas the I/O bus bridge 1312 couples the two buses 1306 and 1308 to each other. A system memory 1314 and one or more network/communication interfaces 1316 may couple to the bus 1306. The hardware system 1300 may further include video memory (not shown) and a display device coupled to the video memory. Mass storage 1318 and I/O ports 1320 may couple to the bus 1308. The hardware system 1300 may optionally include a keyboard, a pointing device, and a display device (not shown) coupled to the bus 1308. Collectively, these elements are intended to represent a broad category of computer hardware systems.

The elements of the hardware system 1300 are described in greater detail below. In particular, the network interface 1316 provides communication between the hardware system 1300 and any of a wide range of networks, such as an Ethernet (e.g., IEEE 802.3) network, a backplane, and the like. The mass storage 1318 provides permanent storage for the data and programming instructions to perform the above-described functions implemented in servers 1222 of FIG. 12, whereas system memory 1314 (e.g., DRAM) provides temporary storage for the data and programming instructions when executed by the processor 1302. I/O ports 1320 are one or more serial and/or parallel communication ports that provide communication between additional peripheral devices, which may be coupled to the hardware system 1300.

The hardware system 1300 may include a variety of system architectures and various components of the hardware system 1300 may be rearranged. For example, cache memory 1304 may be on-chip with the processor 1302. Alternatively, the cache memory 1304 and the processor 1302 may be packed together as a "processor module," with processor 1302 being referred to as the "processor core." Furthermore, certain embodiments of the present disclosure may neither require nor include all of the above components. For example, the peripheral devices shown coupled to the standard I/O bus 1308 may couple to the high performance I/O bus 1306. In addition, in some embodiments, only a single bus may exist, with the components of the hardware system 1300 being coupled to the single bus. Furthermore, the hardware system 1300 may include additional components, such as additional processors, storage devices, or memories.

An operating system manages and controls the operation of the hardware system 1300, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
identifying messaging activity information indicating a particular social network friend most recently messaged by a first player of an online game provided by a game networking system;
determining a manner of displaying icons, based in part on the messaging activity information, for a communication user interface of the first player, each icon representative of a respective social network friend of the first player, wherein at least one of the respective social network friends corresponds to an additional player of the online game;

generating first communication interface display data for display of the icons in the first manner in the communication user interface within a game user interface provided via the game networking system while the online game is loaded into the game user interface;

receiving, via the communication user interface displayed at a client device of the first player, a request to communicate with a second player represented by a respective icon of the icons displayed in the first manner, wherein the second player is associated with the game networking system without being associated with the social networking system; and initiating a first communication session between the first player and the second player in response to the request to communicate with the second player, the communication session allowing communication via the game networking system between the first player and the second player within the communication user interface.

2. The computer-implemented method of claim 1, wherein the icons are representative of a first set of players associated with the game networking system without being associated with the social networking system and a second set of additional players being associated with the game networking system and the social networking system.

3. The computer-implemented method of claim 2, comprising
updating the messaging activity information based on first communication session including a most recent communication of the first player;
determining a second manner of displaying the icons according to updated messaging activity information; and
generating second communication interface display data for display of the icons in the second manner in the communication user interface within the game user interface.

4. The computer implemented method of claim 1, comprising:
receiving, via the communication user interface displayed at the client device of the first player, a request to communicate with a third player represented by another respective icon of the icons displayed in the first manner, wherein the second player is associated with the game networking system and the social networking system; and
initiating a second communication session between the first player and the third player in response to the request to communicate with the third player.

5. The computer-implemented method of claim 4, wherein initiating the second communication session comprises:
initiating the second communication session to be displayed, concurrently with the first communication session, at the client device of the first player.

6. The computer-implemented method of claim 1, further comprising:
generating the messaging activity information to indicate currently offline additional players.

7. The computer-implemented method of claim 1, further comprising:
generating the messaging activity information to indicate currently online additional players.

8. The computer-implemented method of claim 1, further comprising:
generating the messaging activity information to indicate at least one game level achieved by a respective additional player.

9. A non-transitory computer-readable medium storing executable instructions thereon, which, when executed by a processor, cause the processor to perform operations comprising:
identifying messaging activity information indicating a particular social network friend most recently messaged by a first player of an online game provided by a game networking system;
determining a manner of displaying icons, based in part on the messaging activity information, for a communication user interface of the first player, each icon representative of a respective social network friend of the first player, wherein at least one of the respective social network friends corresponds to an additional player of the online game;
generating first communication interface display data for display of the icons in the first manner in the communication user interface within a game user interface provided via the game networking system while the online game is loaded into the game user interface;
receiving, via the communication user interface displayed at a client device of the first player, a request to communicate with a second player represented by a respective icon of the icons displayed in the first manner, wherein the second player is associated with the game networking system without being associated with the social networking system; and
initiating a first communication session between the first player and the second player in response to the request to communicate with the second player, the communication session allowing communication via the game networking system between the first player and the second player within the communication user interface.

10. The non-transitory computer-readable medium of claim 9, wherein the icons are representative of a first set of players associated with the game networking system without being associated with the social networking system and a second set of additional players being associated with the game networking system and the social networking system.

11. The non-transitory computer-readable medium of claim 10, comprising:
updating the messaging activity information based on first communication session including a most recent communication of the first player;
determining a second manner of displaying the icons according to updated messaging activity information; and
generating second communication interface display data for display of the icons in the second manner in the communication user interface within the game user interface.

12. The non-transitory computer-readable medium of claim 9, comprising:
receiving, via the communication user interface displayed at the client device of the first player, a request to communicate with a third player represented by another respective icon of the icons displayed in the first manner, wherein the second player is associated with the game networking system and the social networking system; and
initiating a second communication session between the first player and the third player in response to the request to communicate with the third player.

13. The non-transitory computer-readable medium of claim 12, wherein initiating the second communication session comprises:
  initiating the second communication session to be displayed, concurrently with the first communication session, at the client device of the first player.

14. The non-transitory computer-readable medium of claim 9, further comprising:
  generating the messaging activity information to indicate currently offline additional players.

15. The non-transitory computer-readable medium of claim 9, further comprising:
  generating the messaging activity information to indicate currently online additional players.

16. The non-transitory computer-readable medium of claim 9, further comprising:
  generating the messaging activity information to indicate at least one game level achieved by a respective additional player.

17. A computer system comprising:
  a processor;
  a memory device holding an instruction set executable on the processor to cause the computer system to perform operations comprising:
  identifying messaging activity information indicating a particular social network friend most recently messaged by a first player of an online game provided by a game networking system;
  determining a manner of displaying icons; based in part on the messaging activity information, for a communication user interface of the first player, each icon representative of a respective social network friend of the first player, wherein at least one of the respective social network friends corresponds to an additional player of the online game;
  generating first communication interface display data for display of the icons in the first manner in the communication user interface within a game user interface provided via the game networking system while the online game is loaded into the game user interface;
  receiving, via the communication user interface displayed at a client device of the first player, a request to communicate with a second player represented by a respective icon of the icons displayed in the first manner, wherein the second player is associated with the game networking system without being associated with the social networking system; and
  initiating a first communication session between the first player and the second player in response to the request to communicate with the second player, the communication session allowing communication via the game networking system between the first player and the second player within the communication user interface.

18. The computer system of claim 17, wherein the icons are representative of a first set of players associated with the game networking system without being associated with the social networking system and a second set of additional players being associated with the game networking system and the social networking system.

19. The computer system of claim 18, comprising:
  updating the messaging activity information based on first communication session including a most recent communication of the first player;
  determining a second manner of displaying the icons according to updated messaging activity information; and
  generating second communication interface display data for display of the icons in the second manner in the communication user interface within the game user interface.

* * * * *

UNITED STATES PATENT AND TRADEMARK OFFICE
CERTIFICATE OF CORRECTION

PATENT NO. : 9,751,020 B2  
APPLICATION NO. : 15/214166  
DATED : September 5, 2017  
INVENTOR(S) : Ramachandran et al.

Page 1 of 1

It is certified that error appears in the above-identified patent and that said Letters Patent is hereby corrected as shown below:

On the Title Page

On page 2, in Column 2, item (56), under "Other Publications", Line 11, delete "19/948,774," and insert --13/948,774,-- therefor In the Specification In Column 6, Line 8, after "interface", insert --.--

In the Claims

In Column 25, Line 28-29, in Claim 3, after "comprising", insert --:--

In Column 25, Line 40, in Claim 4, delete "computer implemented" and insert --computer-implemented-- therefor In Column 27, Line 30, in Claim 17, delete "icons;" and insert --icons,-- therefor Signed and Sealed this  
Fourth Day of June, 2019

Andrei Iancu  
*Director of the United States Patent and Trademark Office*